ELECTRON TUBE DEVICE FOR IMAGE TRANSMISSION AND RECEPTION

Filed April 19, 1966 3 Sheets-Sheet 1

INVENTOR.
BY SHOICHI MIYASHIRO
Stephen H. Frishauf
Atty

INVENTOR.
SHOICHI MIYASHIRO
BY Stephen H. Trishauf

INVENTOR.
SHOICHI MIYASHIRO
BY Stephen H Tris haus

United States Patent Office 3,388,283

Patented June 11, 1968

3,388,283

ELECTRON TUBE DEVICE FOR IMAGE TRANSMISSION AND RECEPTION

Shoichi Miyashiro, Yokohama-shi, Japan, assignor to Tokyo Shibaura Electric Co., Ltd., Kawasaki-shi, Japan, a corporation of Japan Filed Apr. 19, 1966, Ser. No. 543,577

Claims priority, application Japan, Apr. 23, 1965, 40/23,709

4 Claims. (Cl. 315—12)

ABSTRACT OF THE DISCLOSURE

Optical images projected upon a photoelectric surface or applied as modulating signals to an electron gun, are selectively recorded on pluralities of storage targets located within a tube, and mechanically placeable in position by rotating the targets; the targets are connected to a rotor located within the tube, surrounded on the outside thereof by a stator so control of target location can be achieved without break of tube vacuum.

This invention relates to improvements relating to an electron tube device utilized for the transmission and reception images in such communication systems as a video telephone and the like, and more particularly to an electron tube device wherein a plurality of storage targets are substantially displaced from each other to enable simultaneous reproduction, transmission and reception of an optical or light image.

It is the principal object of this invention to provide a novel electron tube device which can transmit picture images concurrently with the reception thereof.

Further objects and advantages of the present invention will become apparent and this invention will be better understood from the following description.

FIG. 1 is a diagrammatic representation of essential elements of a proposed single target type electron tube device for image transmission and reception;

FIG. 2 diagrammatically shows a longitudinal cross-section of one embodiment of a multiple target type electron tube device for image transmission and reception in accordance with the invention;

Figure 1:
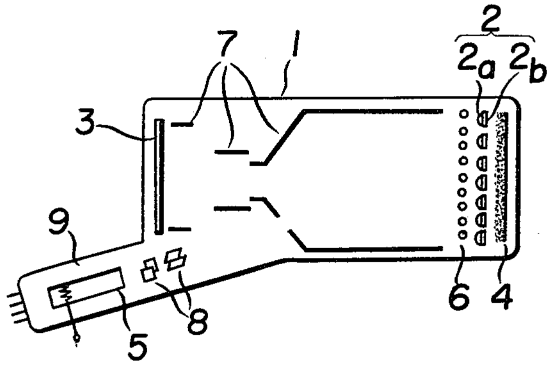

In order to have better understanding of this invention the outline of an electron tube device adapted to transmit and receive images in such communication systems as a video-telephone and the like will first be considered by referring to FIG. 1 of the accompanying drawings. For a full explanation of the tube and the transmission system, reference is made to my application U.S. Ser. No. 543,102, filed Apr. 18, 1966, entitled, Electron Tube for Both Transmission and Reception of Visual Information, and assigned to the assignee of the present invention.

The electron tube is illustrated as comprising a vacuum envelope 1 of glass, a photoelectric surface 3 positioned adjacent the inner surface of one end surface of the envelope 1, a fluorescent screen 4 disposed on the inner surface of the opposite end, a single target 2 adjacent said screen on the side thereof near the photoelectric surface 3, a collector mesh 6 in front of the target 2 and a plurality of cylindrical electrodes 7 disposed between the collector mesh and the photoelectric surface 3 to form an electron lens. A side tube 9 is formed on the end surface of the vacuum envelope 1 on the same side as the photoelectric surface to house an electron gun 5 and a deflector 8 therein. The storage target 2 comprises, a metal screen 2*b* of 750 meshes per inch, for example, having a vapor deposited coating of an insulator, such as calcium fluoride, of several microns thick.

The electron tube device mentioned above is utilized in such a manner that image electron currents produced by focussing an optical image on the photoelectric surface or electron currents emitted from the electron gun and modulated by external image signals are caused to project upon the storage target 2 to form electrostatic images thereon, then the storage target on which had been stored said electrostatic images is scanned or flood lighted with an electron current emitted from the electron gun or the photoelectric surface to derive image signals currents out of the tube through the modulating action, alternatively, the produced image signal currents are caused to impinge upon a fluorescent screen to reproduce images.

With the electron tube for image transmission and reception of the type described hereinabove, it is possible to transmit and receive picture images or to switch the same tube between transmission and receiving operations. However it is impossible to simultaneously treat a number of picture images, which may be inconvenient when such a tube is employed in a video-telephone system for example.

Figure 4:
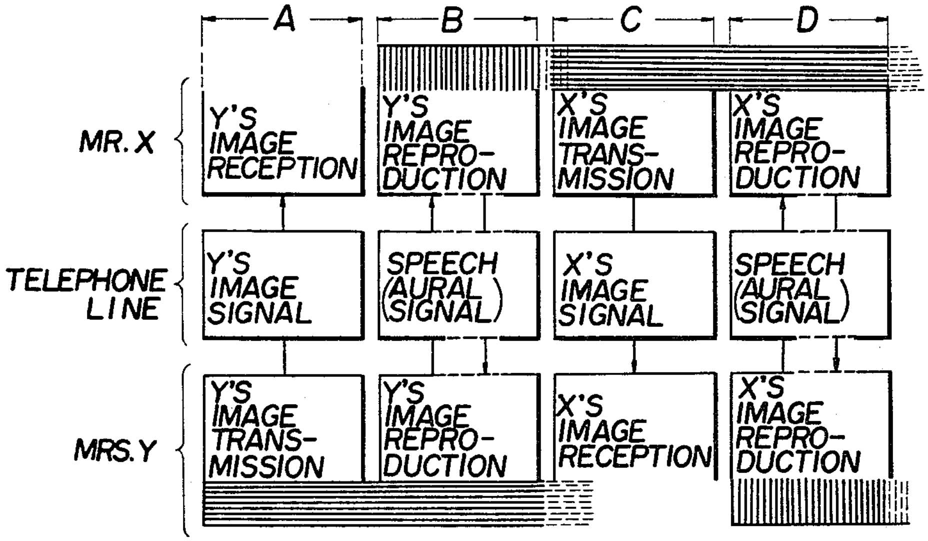
FIG. 4 PRIOR ART
FIG. 4 is a chart to explain a communication program of a video-telephone system utilizing the device of FIG. 1.

FIG. 4 illustrates a communication program to explain the operation of a conventional video-telephone system; it is to be understood that the program proceeds from left to right of the figure, the transmission and reception of the picture images are made inermittently over a single telephone line of narrow band width and that speech is possible between transmission of images. The operation of this system is as follows:

At a remote station, a picture of Mrs. Y is projected on the photoelectric surface of the image transmission and reception tube by exposing the image for 0.1 sec., for example. The image of Mrs. Y is stored on the storage target by means of image photoelectrons produced. During an interval A the storage target is subjected to slow-speed scanning action for an interval of 5 seconds, for example, by means of an electron beam from the electron gun to produce image signals which are sequentially transmitted to Mr. X at a near station. At this station, received signals are utilized to modulate an electron beam emitted from the image transmission and reception tube to store Mrs. Y's image on the storage target in the near station in synchronism with the scanning in the remote station. During an intetrval B succeeeding to the image transmitting and receiving interval A, photoelectric surfaces in respective stations are illuminated with flood lights and the produced flood light electron currents are projected upon respective storage targets to obtain distributed image currents. These image currents are caused to impinge upon respective fluorescent screens thus reproducing Mrs. Y's image in the near station while Mr. X's image is reproduced in the remote station. This interval B may continue for any desired time interval and speech is possible during this interval, if desired. Then an interval C is commenced upon exchanging signals between both stations, however it being understood that FIG. 4 shows a case wherein transmission and reception of images are effected in reverse order as in the interval A. During an interval D speech are exchanged while Mr. X's image is reproduced in the near station whereas Mrs. Y's image is reproduced in the remote station.

In FIG. 4, a region shaded with vertical lines denotes that Mrs. Y's image is being reproduced whereas a region shaded with horizontal lines denotes that Mr. X's image is being reproduced. Regions with dotted shading lines represent the conditions wherein images which have been reproduced still continue to luminesce by residual luminescent effect of the luminous body, thus fading gradually.

With a video-telephone system utilizing the electron tube device shown in FIG. 1 and adapted for transmission and reception of images, during the interval B or D users at both stations merely view the same picture at the same time they can not see the other's image at any desired time. The basic reason of this is that ony one storage target is utilized.

This invention contemplates to provide a novel electron tube which can be used in communication systems capable of simultaneous transmission and reception of a plurality of images. The novel electron tube is especially suitable for use in video-telephone systems.

The invention will now be described in detail with reference to the accompanying drawings, FIGS. 2 and 3 of which illustrate embodiments of the image transmitting and receiving devices having a movable, multiple target system.

Figure 2:
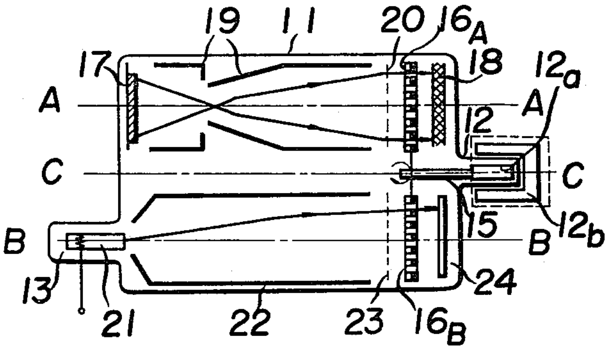

In the embodiment shown in FIG. 2 a cylindrical vacuum envelope 11 is provided with a projected end 12 extending along the longitudinal axis thereof and a rotor or armature 12*a* of an electric motor 14 is contained therein to cooperate with a field coil or the stator 12*b* mounted on the exterior of the projected end 12. The rotor drives a motor shaft 15, on the opposite end thereof there are mounted two storage targets 16A and 16B which are disposed to have a phase difference of 180° and are connected to independent external circuits. These storage targets are arranged to become aligned with axes A and B, respectively, by the rotation of the electric motor. Each of the storage target 16A and 16B comprises a metal screen (back electrode) of 750 meshes per inch, for example, and a storage layer for storing electrostatic charges corresponding to signals, which is formed by vapor depositing to a thickness of several microns such as calcium fluoride on one surface of said screen. Coaxially with the axis A there are provided a photoelectric surface on the inner surface of one end of the vacuum envelope 11 and a fluorescent screen 18 on the opposite end surface. Between the photoelectric surface and the fluorescent screen there are arranged a group of cylindrical focussing electrodes 19, and a collector mesh 20, said rotary storage targets 16A and 16B being disposed to be alternately brought to a position intermediate the collector 20 and the fluorescent screen 18. A projection 13 is provided for one end of the vacuum cylinder on the axis B which is positioned at a position displaced by 180° with respect to the axis A, and an electron gun 21 and a deflector (not shown) are housed in the projection 13. On the extension of the axis B there are mounted a cylindrical anode 22, a collector mesh 23 and a signal plate 24, said collector mesh 23 and signal plate being spaced axially to receive said rotary storage target 16A or 16B therebetween.

An example of a video-telephone system utilizing the electron tube device shown in FIG. 2 will now be described hereunder by referring to FIG. 5.

(*a*) *Preparatory operation for storing signals*

In order to store a new signal it is necessary to erase or to convert into a suitable uniform potential condition an old image which was previously stored and is now of no use or a potential pattern which is not suitable for the write-in signal. At first it is assumed that the photoelectrons emitted from the photoelectric surface 17 are directed to the storage target 16A which has been brought to coincide with the axis A. A typical process includes two steps as follows: In the first or erasing step a flood of electron current is produced by illuminating the photoelectric surface with flood light; this current is caused to impinge upon the target 16A at an energy at which the ratio of secondary electron emission exceeds unity. For example, if it is assumed that the photoelectric surface 17 is maintained at zero volt, the collector mesh 20 at 300 volts and the back electrode of the target 16A at 340 volts, then the potential of the storage surface would be averaged to a potential which is slightly less than that of the back electrode, 335 volts, for example, by emitting secondary electrons from the storage surface, thus quickly erasing the old image of electrostatic charge which may have remained thereon.

The next step in the preparatory operation, the operation required to bring the potential difference between the storage surface and the back electrode to a value necessary for the succeeding write-in operation. The potential of the back electrode is switched to +15 v. while maintaining the potentials of other electrodes unchanged; the potential of the storage surface is thus decreased to +10 v. by the capacitive coupling. Then the flood light photoelectric current is caused to impinge upon the storage target the potential of the storage target surface will be reduced to a potential near the potential of the photoelectric surface or to a potential near zero volt, thus completing the preparatory operation for write-in. This operation may also be effected by causing the flood light electron current or the scanning electron beam emitted from the electron gun to impinge upon the target positioned on the axis B.

(*b*) *Signal write-in operation*

Two methods may be used for write-in electrostatic images on the storage target; in one, the photoelectrons are used and in another the electron current emitted from the electron gun is used. In the first method an image photoelectron current produced by projecting an optical image upon the photoelectric surface 17, FIG. 2 (maintained at zero volt), is focussed upon the storage target to store it by means of the electron lens formed by electrodes 19. In this case, if the collector 20 and the back electrode of the target were maintained respectively at 300 v. and 340 v., the storage surface, which has been maintained at 325 v. by capacitive coupling would be charged positively by emitting secondary electrons due to impingements of the photoelectrons. Like the operation which has been described above in connection with the erasing operation the maximum limit of the positive charge is 335 v., and the dark portions of the image remains only at 325 v. While the potential of the positive charge depends upon the brightness of the image it is advantageous to select the range of the potential to be approximately from 325 v. to 330 v. To this end, it is advisable to adjust the time of exposure 4 or time of storage, intensity of illumination, focussing of the optical lens and the like.

With regard to the method of utilizing the electron current from the electron gun, image signals are applied to the electron gun 21 to emit a modulated electron beam and then the modulated electron beam is used to scan across the target 16B, as shown in FIG. 2. When the cathode of the electron gun is maintained at a potential of 0 volt, the collector 23 at 300 v. and the back electrode of the target 16B at 340 v., then an electrostatic image would be formed across the entire surface of the target upon completion of scanning by the same mechanism as in the case of the photoelectron current.

(*c*) *Optical image reproducing operation*

Where it is desired to reproduce the optical image on a fluorescent screen the target on which the desired image is stored, for example, the target 16B shown in FIG. 2 is rotated to a position on the axis A. If the potential of the back electrode of the target 16B were maintained at +10 v., then the storage surface will have an image potential of from 0 to −5 v. When accelerating the flood light electron current which is produced by illuminating the photoelectric surface maintained at 0 v., while maintaining the collector 20 at a potential of 300 v., thus causing the electron current to impinge upon the target 16 v., the electron current will be modulated by the image potential at various points when it passes through the screen of the target. Images can be reproduced by causing the electron current which has passed through the screen in this manner to impinge upon the fluorescent screen 18 maintained at 5 kv.

(*d*) *Image transmitting operation*

Images stored on the target are derived from vacuum envelope 11 as image signals in the following manner. Supposing that the target 16A carries the desired image, and this target is rotated to the position on the axis B. If the back electrode of the target 16A were maintained at a potential of +10 v., then the storage surface will have an image potential of from 0 to −5 v. By maintaining the collector 23 at 300 v. and by accelerating, focussing and deflecting the electron beam emitted from the cathode of the electron gun 21 which is maintained at 0 v., so as to scan the target 16A, the electron beam will be modulated by the control grid action provided by the target, thus imparting an image signal current to the signal plate 24.

As described hereinabove, the novel electron tube device for transmitting and receiving images enables write-in of optical images, into one of a plurality of storage targets. The write-in may be by projecting the image upon a photoelectric surface; or by placing electrostatic charges, corresponding to electric image signals to modulate an electron beam from an electron gun. According to the novel electron tube device it is also possible to store these images for any desired time interval and thereafter to read out by means of electrons emitted from the electron gun or the photoelectric surface thereby permitting reproduction of the image and the generation of the image current. Due to the presence of a plurality of targets, it is possible to optically reproduce a picture image X while at the same time to receiving or transmit another picture image Y by utilizing another target.

Figure 3:
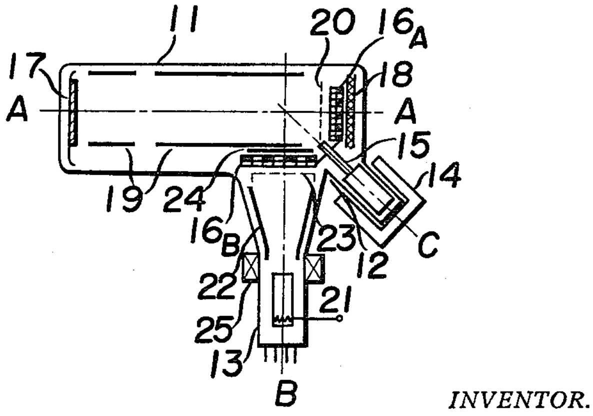
FIG. 3 shows a similar view of a modified tube device.

FIG. 3 shows another embodiment of this invention wherein axes A and B, similar to those shown in FIG. 2, are disposed at right angles and a plurality of targets are rotated by an oblique shaft C. A plurality of targets can be disposed in many different ways. For example, they may be disposed in parallel on the side surface of a rotary cylinder, or juxtaposed on a movable belt. Suitable amplifying means, such as a secondary electron multiplier which is adapted to receive the electron current passed through the storage target, may be advantageously incorporated in the electron tube. It is also possible to install a magnifying type electron lens between the storage target and the fluorescent screen so that the image electron current which has passed through the storage target may be projected after magnification thus obtaining an output image which is of large size and easy to view.

The novel electron tube device with the fundamental operation described above can be applied to various applications. Its typical example is the application thereof is a video-telephone system of the slow-speed scanning type. FIG. 6 diagrammatically represents the circuit arrangement of such system while FIG. 5 illustrates a typical program of a video-telephone communicates on system. This example shows a talking schedule of the video-telephone between Mr. X and Mrs. Y over a single telephone line. At first both Mr. X and Mrs. Y carry out the erasing preparatory operations of the respective targets according to the method mentioned above, and Mrs. Y will project her own image on its own tube Y, through an associated optical system whereby to store it on a storage target $Y_8A$, according to the above described operation. This operation may be completed in above 0.3 second, for example. Then Mrs. Y will rotate its target system to bring the target $Y_8A$ to a position opposite to an electron gun to read out her stored electrostatic image by means of a scanning beam whereby to send it to Mr. X over an amplifier $Y_7$, a change-over switch $Y_5$ and a transmission circuit 33. On the side of Mr. X, the received image is applied to an electron gun in a tube X, through an amplifier $X_6$ to scan a target $X_8B$ by a modulated electron beam to store the image of Mrs. Y thereon. It takes about 3 seconds to transmit said image. During the subsequent vertical fly-back period, after storing own image on a target $X_8A$ of the tube $X_1$ similar to the case of Mrs. Y, Mr. X rotates the target $X_8A$ so a position opposing to the electron gun. During the subsequent fly-back line period the target $Y_8B$ is brought to a position facing the fluorescent screen. During the subsequent communication period both Mr. X and Mrs. Y illuminate respective photoelectric surfaces with flood lights to cause generated flood light currents to impinge upon respective storage target $X_8B$ and $Y_8B$ to reproduce the other party's images on the respective fluorescent screen. During this period since the transmission line is not occupied by image signals, conversation for any desired interval can be transmitted.

It is of course possible to reproduce on the side of Mr. X, Mrs. Y's image which has already received while the image of Mr. X is being sent from Mr. X to Mrs. Y. However, with the tube shown in FIG. 2, during reception, it is impossible to continue to reproduce at a definite strength the image that has been reproduced during preceding period. In such a case it is advisable to construct the screen with a fluorescent body having residual fluorescence property with substantially the same attenuation time as the receiving period.

Figure 5:
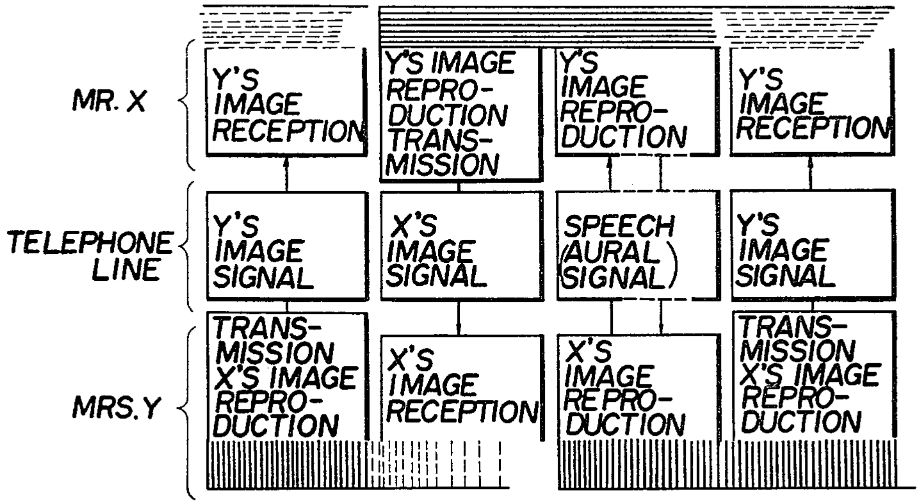
FIG. 5 is a chart to explain an example of a communication program of a video-telephone system employing the device of this invention.
Figure 6:
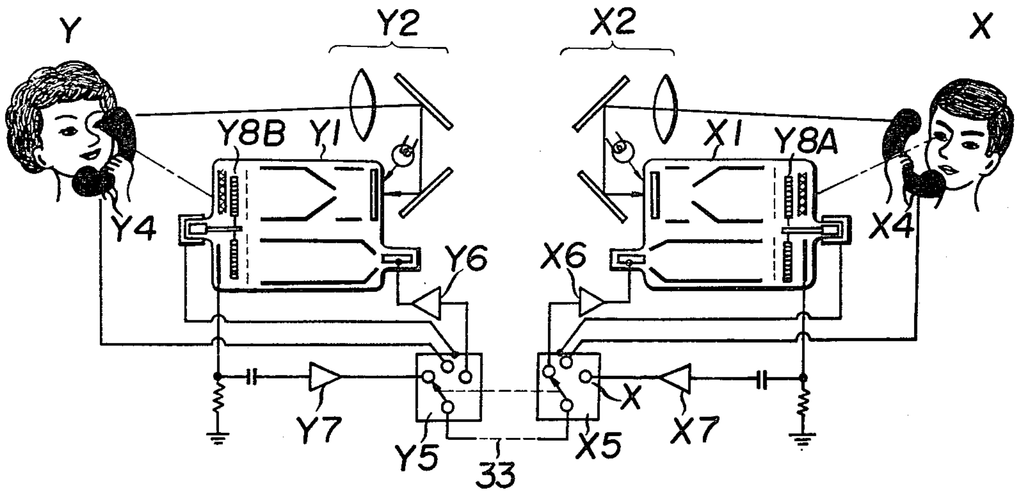
FIG. 6 shows a connection diagram of one example of a video-telephone communication system employing the electron tube device of this invention.

FIG. 5 is a chart to explain the communication program of the video-telephone system embodying this invention, in which time axis is denoted by a horizontal line. In this figure regions shaded with solid vertical lines represent that the image of Mr. X is being reproduced, whereas regions shaded with dotted lines represent that reproduced images are displayed by the residual luminescence of the luminous body which is decaying gradually. In this manner one may communicate concurrently while viewing the other party's image. By comparing FIG. 5 with FIG. 4 which shows the communication program of the prior art system it will be clearly seen that the video-telephone system of this invention is very convenient.

While in the above descriptions and in FIGS. 2 and 3, the electron tubes have been shown with two storage targets, it will be clear that more storage targets than two can also be used. It will also be apparent that various modifications and changes may be made without departing from the spirit and scope of the invention as sought to be defined in the following claims.

What is claimed is:

1. An electron tube device for image transmission and reception comprising an evacuated envelope, a photoelectric surface disposed in said envelope and adapted to produce a photoelectron current in response to the projection of an optical image thereon, a first target disposed at a position opposite to said photoelectric surface to store an electrostatic charge image when impinged by said photoelectron current, an electron gun adapted to generate an electron beam which is modulated by an external image signal, a second target disposed at a position opposite to said electron gun to store an electrostatic charge image corresponding to said external image signal when scanned by said electron beam, a mechanism to move said plurality of targets within said envelope to selectively change the relative positions thereof, means to cause a photoelectron current produced by illuminating said photoelectric surface with flood light to pass through the target located in position opposite to said photoelectric surface to modulate said photoelectron current by the stored electrostatic charge image on said target, a fluorescent screen arranged to display said image when impinged by said modulated photoelectron current, and means to generate a non-modulated electron beam from said electron gun to scan the target located at the position opposite to said electron gun to derive an image signal corresponding to said electrostatic charge image stored thereon.

2. The electron tube for image transmission and reception according to claim 1 wherein said mechanism comprises an electric motor including a rotor located in said evacuated envelope, a stator outside of said envelope located to surround said rotor and a rotary shaft on said motor, said shaft being connected to position said plurality of storage targets at positions symmetrical to the axis of said rotor and to move said targets as said rotor rotates.

3. The electron tube device for image transmission and reception according to claim 1 wherein said storage targets are storage targets of mesh type.

4. The electron tube device for image transmission and reception according to claim 1 wherein each of said image signals is a signal of narrow band width suitable for telephone lines.

References Cited

UNITED STATES PATENTS

| | | | |
|---|---|---|---|
| 2,520,507 | 8/1950 | Marcy | 178—6.8 |
| 2,537,173 | 1/1951 | Szegho et al. | 178—6.8 |

RODNEY D. BENNETT, *Primary Examiner.*

J. P. MORRIS, *Assistant Examiner.*